US012488537B2

(12) United States Patent
Su

(10) Patent No.: US 12,488,537 B2
(45) Date of Patent: Dec. 2, 2025

(54) MACHINE LEARNING TRAINING AND LAYOUT ESTIMATION

(71) Applicant: STREEM, LLC, Portland, OR (US)

(72) Inventor: Huapeng Su, Portland, OR (US)

(73) Assignee: STREEM, LLC, Portland, OR (US)

( * ) Notice: Subject to any disclaimer, the term of this patent is extended or adjusted under 35 U.S.C. 154(b) by 349 days.

(21) Appl. No.: 18/120,101

(22) Filed: Mar. 10, 2023

(65) Prior Publication Data
US 2023/0290062 A1  Sep. 14, 2023

Related U.S. Application Data

(60) Provisional application No. 63/318,706, filed on Mar. 10, 2022.

(51) Int. Cl.
*G06T 17/20* (2006.01)
*G06T 7/20* (2017.01)
*G06T 7/80* (2017.01)

(52) U.S. Cl.
CPC .............. *G06T 17/20* (2013.01); *G06T 7/20* (2013.01); *G06T 7/80* (2017.01); *G06T 2207/10028* (2013.01); *G06T 2207/20081* (2013.01); *G06T 2207/20084* (2013.01)

(58) Field of Classification Search
CPC ....... G06T 2207/20084; G06T 2210/56; G06T 17/05; G06T 2207/10028; G06T 7/20; G06T 17/20; G06T 7/80; G06T 2207/20081
See application file for complete search history.

(56) References Cited

U.S. PATENT DOCUMENTS

| | | | |
|---|---|---|---|
| 2021/0225090 A1* | 7/2021 | Tang | G06T 19/003 |
| 2021/0279957 A1* | 9/2021 | Eder | G06F 18/2413 |
| 2022/0027656 A1* | 1/2022 | Jia | G06T 7/55 |
| 2022/0207465 A1* | 6/2022 | Collard | G06N 3/08 |
| 2022/0269888 A1* | 8/2022 | Stoeva | G06T 19/006 |
| 2022/0292421 A1* | 9/2022 | Murphy | G06V 10/82 |
| 2023/0125295 A1* | 4/2023 | Min | G06T 7/74 701/25 |
| 2023/0196726 A1* | 6/2023 | Deng | G06V 10/762 382/128 |

(Continued)

OTHER PUBLICATIONS

Phalak et al., "DeepPerimeter: Indoor Boundary Estimation from Posed Monocular Sequences", Apr. 25, 2019, pp. 1-11. https://doi.org/10.48550/arXiv.1904.11595.

(Continued)

*Primary Examiner* — Phi Hoang
(74) *Attorney, Agent, or Firm* — Schwabe Williamson & Wyatt

(57) ABSTRACT

Artificial neural networks (ANN) may be trained to output estimated floor plans from 3D spaces that would be challenging or impossible for existing techniques to estimate. In embodiments, an ANN may be trained using a supervised approach where top-down views of 3D meshes or point clouds are provided to the ANN as input, with ground truth floor plans provided as output for comparison. A suitably large training set may be used to fully train the ANN on challenging scenarios such as open loop scans and/or unusual geometries. The trained ANN may then be used to accurately estimate floor plans for such 3D spaces. Other embodiments are described.

20 Claims, 7 Drawing Sheets

(56) References Cited

U.S. PATENT DOCUMENTS

2024/0303973 A1* 9/2024 Ramos Dos Santos ..................... G06V 10/774

OTHER PUBLICATIONS

Chen et al., "Floor-SP: Inverse CAD for Floorplans by Sequential Room-wise Shortest Path", Aug. 19, 2019, pp. 1-10. https://doi.org/10.48550/arXiv.1908.06702.

Chen et al., "FloorNet: A Unified Framework for Floorplan Reconstruction from 3D Scans", Mar. 31, 2018, pp. 1-21. https://doi.org/10.48550/arXiv.1804.00090.

Avetisyan et al., "SceneCAD: Predicting Object Alignments and Layouts in RGB-D Scans", Mar. 27, 2020, pp. 1-19. https://doi.org/10.48550/arXiv.2003.12622.

* cited by examiner

NON-TRANSITORY COMPUTER-READABLE STORAGE MEDIUM
1602

PROGRAMMING INSTRUCTIONS 1604
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 7

MACHINE LEARNING TRAINING AND LAYOUT ESTIMATION

CROSS-REFERENCE TO RELATED APPLICATIONS

This application claims priority to U.S. Provisional Application No. 63/318,706, filed on 10 Mar. 2022, the contents of which are hereby incorporated by this reference as if fully stated herein.

TECHNICAL FIELD

The present disclosure relates to the field of photogrammetry, and specifically to training and use of machine learning techniques to generate a floor plan from a 3D mesh or point cloud.

BACKGROUND

Devices such as modern smartphones and tablets are typically capable of measuring and/or computing depth data of images or videos they capture, useful for supporting augmented reality (AR) and/or other applications involving 3D spaces. These captured images or video and derived or captured depth data may be processed using various algorithms to create digital re-creations of a captured 3D space. The captured depth data and/or detected features, combined in some implementations with data from depth sensors and/or motion information captured from motion sensors such as a MEMS gyroscope and accelerometers, can facilitate software in creating a point cloud in a three-dimensional space. This point cloud enables generation of a 3D mesh, which comprises the digital re-creation of the 3D space represented by the captured images and/or video. The 3D mesh can subsequently be manipulated or otherwise interacted with, apart from or in conjunction with the capturing device.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 7 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
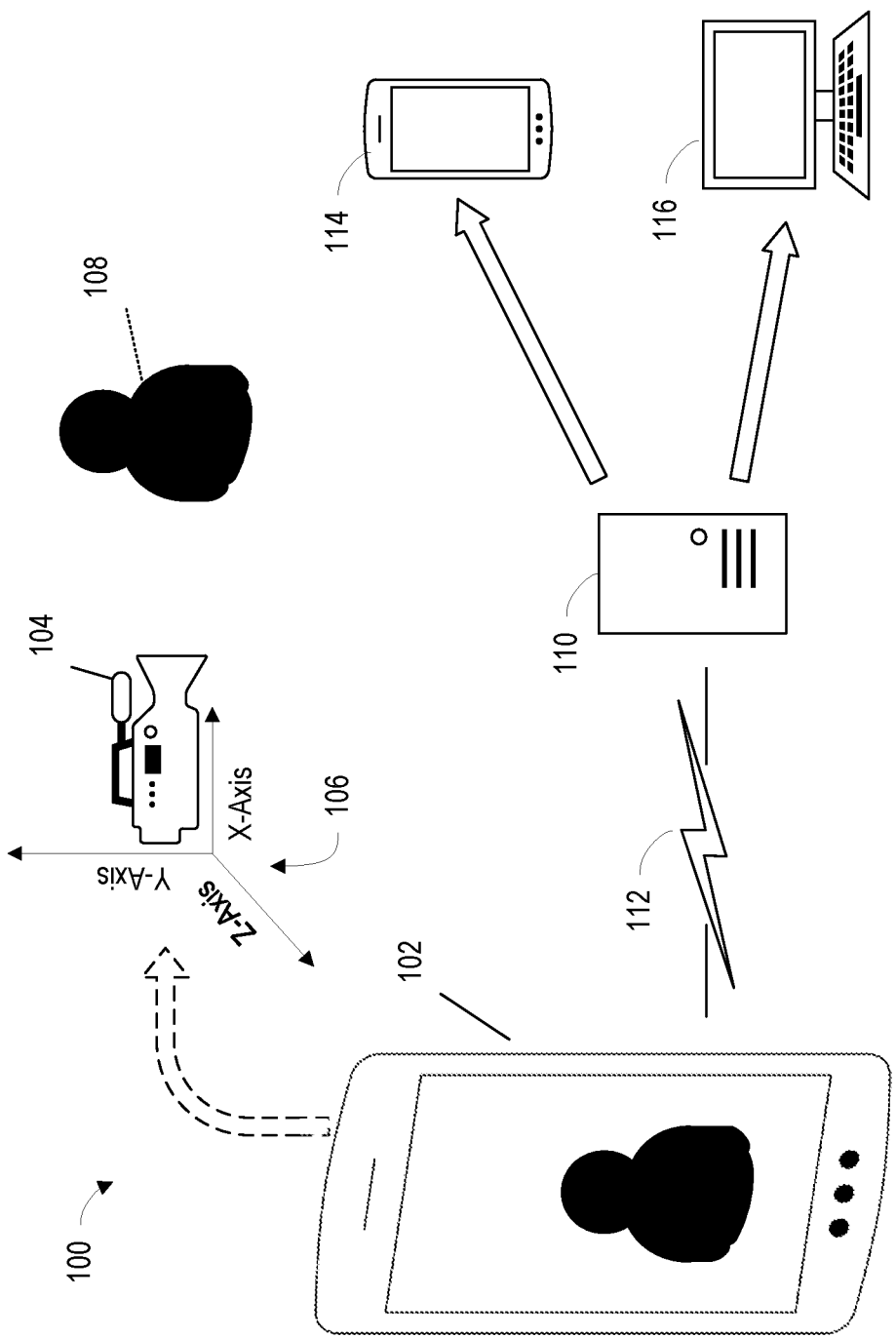
FIG. 1 illustrates a block diagram of the components of a system for capturing an image and corresponding spatial data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Modern computing devices such as smartphones, tablets, laptops, desktops, and other computing platforms can capture and/or transmit spatial data associated with video and audio being captured and transmitted. Spatial data typically includes (but is not limited to) depth data, where various points in an image or video, which may be identified by x-y coordinates, are associated with z coordinates indicating the distance at each point from some reference point to whatever surface or object is imaged at each point. The reference point is typically the capturing device, but may be designated as some other object or point. Depth data may be included as part of a three-dimensional (3D) point cloud, which may be linked or correlated to the image or video giving rise to the spatial data.

Computing systems can derive depth data using various methods, such as photogrammetric techniques, through which three-dimensional (3D) spatial relationships can be ascertained, and/or using sensors specifically configured to directly measure depth. Depending upon the capabilities of a capturing device, depth data may be directly measured or calculated on the fly from captured video, possibly in conjunction with depth sensors and/or spatial position sensors that may be equipped to the capturing device. For example, most modern smartphones are equipped with an array of sensors beyond well-known cameras and microphones. A modern smartphone may also include depth sensor(s), such as a LiDAR imager or rangefinder, and motion sensing, such as multi-axis gyroscopes and accelerometers, to contribute spatial data about camera movements. Combined with image analysis and photogrammetry techniques, as well as techniques such as simultaneous localization and mapping (SLAM) that allow integration of depth, motion, and other spatial data to enable a device to both measure its environment and know its position within the environment, the array of sensors allow for the relatively accurate capture and/or calculation of depth information for a captured space.

Once depth data for a space has been measured or calculated, this information can be used to generate a 3D mesh of the captured space. The 3D mesh is essentially a virtual model of the captured space, which may be textured using images from the video of the captured space. The depth information, as part of or expressed as a 3D point cloud that represents the captured space, can be used to construct the mesh essentially by "connecting the dots", viz. repeatedly connecting sets of three points of the 3D point cloud together with edges to form a mesh of triangles that approximates the space from which the depth information was obtained. The depth information may be obtained by using a suitably equipped device, as described above, to scan or capture the space. This may be accomplished by panning and/or moving the device with its video camera and any depth scanning sensors active so that the video camera and sensors capture a 360 degree view of the space. Further, the position of the capturing device within the space can be known relative to the depth data via the motion sensors capturing motion data and determined with respect to each successive frame of video simultaneously captured by the device, such as by use of spatial position sensors equipped to the capturing device.

The resulting 3D mesh can provide a model with which a user may interact, including moving through the model and/or rotating the model to view different aspects from a variety of perspectives. The model, if sufficiently precise, may be used to take measurements of various features and structures. Where the model is a building space, it may further be desirable to obtain a floor plan from the model, e.g. a two dimensional top-down view of the captured space, similar to what may be seen in a set of building plans.

Traditional methods of obtaining a floor plan included either providing construction plans or blueprints, or for an existing structure where such plans are not readily available, employing a professional to precisely measure a space and create a floor plan. The increasing prevalence of hand-held devices such as a smartphone that can create ad hoc scans of 3D spaces has given rise to the possibility of a casual user obtaining a floor plan from a 3D mesh created by such an ad hoc scan. However, where a 3D scan is generated for creation of a floor plan, it may nevertheless require the skills and time of a professional to obtain a scan that is sufficiently clean and precise to yield a floor plan that is accurate, as will be explained.

Existing methods of obtaining a floor plan from a 3D model involve various types of segmentation, where planes corresponding to walls and floors are identified, which allows for extrapolation of corners, edges, and other basic geometric features that allow creation of a floor plan. There are various known techniques in which these segments are identified, such as forms of object or plane detection. These techniques may fail to provide accurate results when presented with a scan of a 3D space that is less than ideal, such as an incomplete scan, a noisy scan, and/or scan of a space that includes an array of different objects within the space that may at least partially occlude walls and other boundaries. Such imperfect scans may result in failure to identify some of the room segments, misidentification of segments, and/or recognition of false or phantom segments, to name a few possible errors. Existing methods that may be sufficiently robust to yield somewhat acceptable results from a noisy scan may be constrained by rule limitations intended to allow processing of a relatively noisy or cluttered scan. For example, some methods may assume that any angle between wall and floor segments fall into predetermined quantities, e.g. 0, 45, 90, 135 degrees, etc. Such predetermined limits may allow detection of segments from a noisy scan, but limit the functionality of such methods to buildings that have floor plans where all angles fall within the predetermined quantities. A scan of a building space that has more unusual angles may fail to yield an accurate floor plan. Similarly, some existing methods may require a "closed" scan, where the entire space is scanned for a complete 360 degrees. An "open" scan, where a portion of the building is not scanned, may result in either a failure to generate a floor plan, or a floor plan that includes phantom walls or boundaries for the unscanned portion, which do not actually exist.

Disclosed embodiments address these limitations by providing systems and methods that employ machine learning (ML) techniques, such as one or more artificial neural networks (ANN), that are trained to understand a top-down view of a 3D mesh or point cloud and extract a corresponding 2D floor plan. In embodiments, an ANN is holistically trained by providing it with a top-down view or image of a 3D mesh or point cloud of a space as an input, and pushing a ground truth 2D floor plan image of the space to the ANN output. This process may be repeated with a training data set comprised of a plurality of top-down views and corresponding ground truth floor plans. Once trained, the ANN may be provided with a top-down view of a 3D mesh, and will output the corresponding 2D floor plan. By including a wide variety of scans of varying quality during the training phase, e.g. noisy scans, scans with object clutter, open loop scans, scans of spaces with arbitrary or unusual features or angles, etc., and corresponding ground truth floor plan images, the ANN or ANNs in disclosed embodiments can be taught to estimate relatively accurate floor plans of subsequently provided top-down images of 3D meshes or point clouds. Furthermore, by using an ANN or ANNs that have been holistically trained as described above, such an implementing system may be capable of relatively precise floor plan estimations of spaces with unusual or arbitrary shapes/ angles. Furthermore, by training the ANN or ANNs to accommodate an open loop scan, disclosed embodiments may be employed to estimate floor plans for semi-open spaces, e.g. parking structures, amphitheaters, plazas, etc. Other possible embodiments may be described below.

FIG. 1 illustrates an example system 100 that may enable capture of an image or video that includes spatial data, capture or generate a 3D point cloud from the image/video and spatial data, generate a 3D mesh from the image/video and spatial data, and create a 2D floor plan from the 3D mesh or point cloud. System 100 may include a user device 102, which can serve as a capture device or scanner for a 3D space to be imaged. In the depicted embodiment of FIG. 1, user device 102 is a smartphone, which may be implemented as a computer device 1500, to be discussed in greater detail below with respect to FIG. 6. Other embodiments may implement device 102 as a variety of different possible devices, such as a computer (desktop or laptop), tablet, two-in-one, hybrid, smart glasses, or any other computing device currently known or later developed that can accept a camera and provide necessary positional information, as will be discussed in greater detail herein. User device 102 further may include a camera 104 and at least one spatial position sensor 106 (depicted by a series of axes), which provides information about the spatial position of camera 104. It will be understood that camera 104 and spatial position sensor 106 may be contained within the body of device 102 or, in other implementations, may be external to but in data communication with device 102. Camera 104 is used to capture the surrounding environment of device 102, and by extension, the user. The environment may be a 3D space such as a room or another defined space, or may be an area or region such as a park or outdoor space, and may include one or more three-dimensional objects 108.

Camera 104 may be any camera that can provide a suitable video stream for the intended purpose of user device 102. Where user device 102 is implemented as a smartphone or tablet, camera 104 may be one or more built-in cameras. In other embodiments, such as where consumer device is a laptop, camera 106 may be built in to the device or a separate, external unit, such as a webcam. A suitable video stream may be a digital video stream, which may be uncompressed or may be compressed in embodiments with some form of video compression, such as AVC-HD, H.264, MPEG-4, or another suitable compression scheme. Camera 104 may be configured to output standard or high-definition video, 4K video, 8K video, or another resolution of video suitable for the intended purpose of camera 104 and user device 102. In other embodiments, camera 104 of user device 102 may comprise multiple cameras or similar sensors, where one or more of the sensors may be configured to directly detect depth points, such as a 3D or stereoscopic camera, LIDAR, or other suitable depth-sensing technology. In such embodiments, a point cloud of any space captured by camera 104 may be able to be at least partially obtained via direct measurement from the depth-sensing technology.

Spatial position sensor(s) 106 may be configured to provide positional information about camera 104, such as camera 104's pan, yaw, and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc. As will be understood, spatial position sensor(s) 106 provide information about the camera's pose, e.g. position and orientation of the camera in three dimensions.

In addition to motion data from spatial position sensor 106, camera intrinsics can include various known or readily determined properties of camera 104, such as focal length, aperture, optical center, angle of view, focal point, etc., which may comprise camera intrinsics data. Camera intrinsics, combined with the data described above from spatial position sensor 106, may comprise camera motion data or information that can be used from SLAM, as part of constructing a 3D mesh or point cloud. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 104 is focused relatively far away from the camera position, and/or the camera 104 utilizes a small aperture (relatively high f-stop, such as f/8, f/11, etc.), so as to offer a large depth of field.

System 100 also includes a central server 110, with which user device 102 is in data communication 112. Central server 110 may act to receive information from user device 102 such as video and depth data, camera intrinsics, and/or camera motion data, which may be used with process flows 200 or 40 and/or methods 300 and 500, discussed below. In some embodiments, user device 102 may handle some or all processing of video and depth information for a captured 3D space, including generation of a metaverse, 3D mesh or point cloud, and/or layout or floor planestimation. In other embodiments, depending upon the specifics of a given implementation, central server 110 may carry out some or all processing of the video and depth data to generate an estimated 2D floor plan of a 3D space captured by the user device 102. In embodiments, central server 110 may employ machine learning (ML) techniques to generate the estimated 2D floor plan, including one or more artificial neural networks (ANNs). As will be discussed below, in some embodiments the ANN(s) may be trained, with the training at least in part carried out on or by central server 110. In other embodiments, user device 102 may either handle a part of the processing, or simply act to acquire data about a 3D space and provide raw or partially processed data to central server 110 for further processing.

Also shown in system 100 are one or more additional user devices 114, 116, which may be smartphones, tablets, laptops, desktops, or other servers. These additional user devices 114, 116 may also be in data communication with central server 110, and so may receive raw or processed data captured by user device 102 and/or a completed estimated layout of the 3D space captured by user device 102. User devices 114 and/or 116 may be capable of interaction with a generated 3D mesh or metaverse that may be received from central server 110. Further still, user devices 114, 116 may be enabled to engage in two-way or multi-way interaction with user device 102, either through central server 110 or directly with user device 102, with each device commonly working with a generated 3D mesh and/or metaverse. It should be understood that devices 114 and 116 are merely examples, and are not indicative of the number or type of devices connected to central server 110; a given implementation may have an arbitrary number of devices connected to central server 110, user device 102, or both.

User device 102, as mentioned above, is in data communication 112 with central server 110, along with user devices 114 and 116. Data communication 112 may be implemented using any suitable data communication link technology, which may be wired, wireless, or a combination of both. Example communications technologies are discussed below with respect to FIG. 6.

Figure 2:
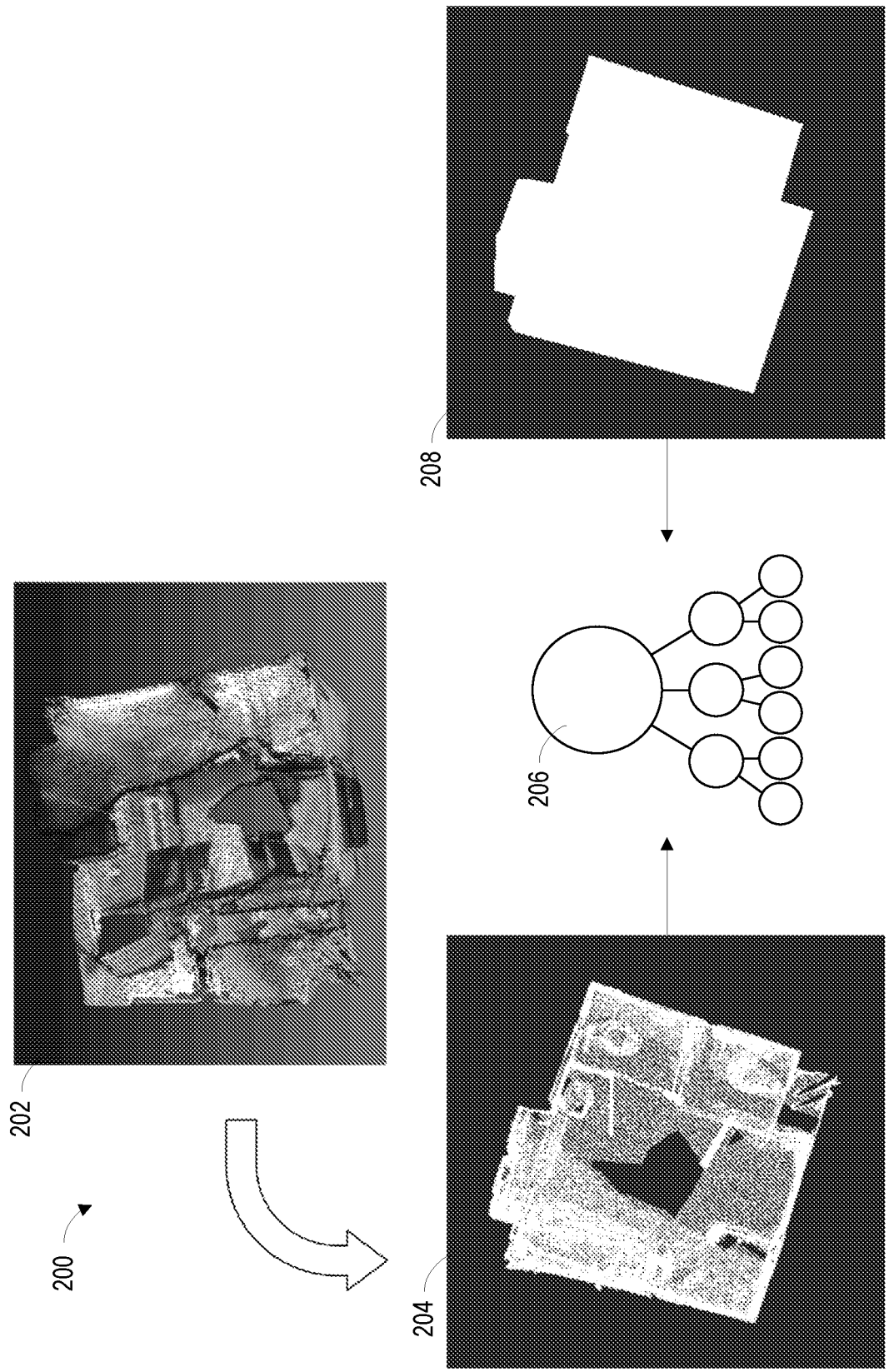
FIG. 2 depicts an example process flow for training a machine learning system, such as an artificial neural network, to generate 2D plan views for 3D meshes or point clouds, according to various embodiments.

FIG. 2 depicts an example process flow 200 for training a ML-based system to estimate 2D floor plans from 3D meshes or point clouds, such as may be provided by, or derived from information captured by, a capturing device, depending upon the functionality of the capturing device. As mentioned above, the capturing device may be a user device 102. In embodiments, the capturing device may scan a 3D space, such as with a camera, and may capture motion data associated with the camera. This scan and motion data may be used to generate a 3D mesh or point cloud 202. It will be understood that a 3D mesh is essentially an evolved form of a point cloud, where each point in the point cloud is connected to surrounding points to form the 3D mesh of triangles. Thus, a point cloud may be derived from a 3D mesh, and vice-versa. The 3D mesh or point cloud 202 may or may not be textured, depending upon the specifics of a given embodiment. 3D mesh or point cloud 202, in embodiments, is effectively a virtual model of the scanned 3D space. As such, it can be viewed from different perspectives, similar to moving a virtual camera around the model, apart from the actual position of the capturing device within the 3D space as the space was scanned. A top-down view 204 can thus be created from the 3D mesh or point cloud 202 by orienting a view of the model, such as a virtual camera, to have a top-down perspective, similar to if the capturing device were positioned directly over the 3D space, looking down. Motion data provided by the capturing device, in embodiments, may include accelerometer and/or other data that allows determining up and down orientation, e.g. a set of three accelerometers oriented along x, y, and z axes can determine the direction of gravity, establishing "down". By reference to this motion data provided by the capturing device, the ground or floor plane can then be determined, and the virtual camera positioned for the top-down view, pointed orthogonally towards the ground or floor plane. For purposes of training in process flow 200, a set consisting of multiple of 3D meshes or point cloud 202 may be provided. The size of the set may be selected with respect to the various permutations of possible floor plans and building features that may be encountered, to ensure that the ANN 206 is fully trained to provide accurate floor plan estimates in as many different scenarios as possible.

For each 3D mesh or point cloud 202 in the training set, in some embodiments the top-down view 204 may be rendered as a 2D image, similar to that depicted in FIG. 2. Such an image essentially provides a representation of the 3D space in the form of the various depth points projected down onto a ground or floor plane. Walls appear as brighter features within the point cloud due to a greater density of depth points on their surfaces: where a wall, when typically viewed from the capturing device, presents as an array of points with varying x and y coordinates but consistent z (depth) values for each point, a top-down projection essentially views the wall orthogonally, where the x (horizontal) and z (depth) values of each point form a line defining the wall extent, and the y (vertical) values essentially collapse to form a dense area that defines the wall presence over the more sparse points that define the ground or floor plane, and potentially any objects located on the ground or floor plane. Furthermore, objects located within the space may present as outlines of varying densities. These outlines may be useful to identify other features to be included on a floor plan, such as plumbing fixtures and cabinets. Alternatively, the top-down view 204 may be provided as the 3D mesh or point cloud oriented in a top-down perspective, or with associated camera motion data that allows an implementing system to orient the 3D mesh or point cloud into the top-down view 204.

The top-down view 204, once obtained, is pushed to the input side of an ML process, such as ANN 206. While being trained, a corresponding ground truth floor plan 208 is pushed to the output side of the ANN 206, so that ANN 206 can process a cost function to allow tuning of ANN 206 parameters where a predicted floor plan for a given top-down view 204 does not fully agree with the corresponding ground truth floor plan 208. The ground truth floor plan 208 may be obtained using conventional means, such as surveying or measuring, or by a precise scan of the 3D space; any suitable technique that yields an accurate floor plan of the 3D space represented by the top-down view 204 may be employed. The ground truth floor plan 208, in embodiments, is a 2D image in a top-down view perspective of the scanned 3D space. In the depicted embodiment of FIG. 2, the ground truth floor plan 208 is a top-down silhouette of the floor plan or footprint of the 3D space represented in the top-down view 204. As can be seen, the example ground truth floor plan 208 is a black and white silhouette of the building footprint. In some embodiments, the ground truth floor plan 208 may include some internal structural information, such as the location of various interior walls and/or other structural features. It will be understood that, for training ANN 206, each top-down view 204 in the training set will have a corresponding ground truth floor plan 208.

In embodiments, the top-down view 204 and/or the ground truth floor plan 208 images may be rendered as greyscale or black and white image. Depending upon the specifics of how ANN 206 is implemented, the top-down view 204 and/or ground truth floor plan 208 images may also be normalized to a consistent size, e.g. 1024×1024 pixels, or another size that is suitable based on the complexity of the 3D mesh or point cloud as depicted in the top-down view 204. Furthermore, a person skilled in the relevant art may understand that the size of the images may be selected with regard to the complexity and implementation of the ANN 206, as the input and output layers of the ANN 206 may scale in number of nodes on the basis of the total number of pixels of the input image (top-down view 204) and output image (ground truth floor plan 208), respectively. Different implementations of ANN 206 may require or otherwise accept different formats/sizes for the top-down view 204 and/or ground truth floor plan 208. Still further, some embodiments may accept varying sizes of the images, possibly with preprocessing techniques employed to convert the images into a format suitable for providing to the ANN 206.

In embodiments, the ANN 206 may be one or more artificial neural networks. As will be understood, ANN 206 may comprise a set of layers that are networked together, where a given layer within the ANN may receive input from a previous layer, and may pass its results down to a subsequent layer. An example three-layer ANN may have an input layer which receives data to be analyzed, an output layer which provides results of the data analysis, and a hidden layer that is coupled to the input layer and output layer. An ANN with more layers may add additional interconnected hidden layers. The number of hidden layers may be selected based on at least performance considerations, capabilities of an implementing system, and/or the size of the training set. Multiple hidden layers may be employed for a deep learning approach, particularly when the training set contains a wide variety of different and complex floor plans, and the ANN 206 is expected to be able to accurately predict floor plans for arbitrarily complex 3D spaces. Any type of ANN or ANNs now known or later developed that are suitable and can be trained for analysis and classification of images and/or 3D meshes or point clouds may be employed. Non-limiting examples of possible ANNs include convolution neural networks, graph neural networks, and/or any other type of ANN that may be suited to image processing.

A person skilled in the relevant art will understand that training process flow 200 is a form of supervised learning, where the ANN 206 is provided a known input and a desired output. The supervised learning process, in embodiments, involves defining a cost function that determines or quantifies an error amount between a floor plan estimated by ANN 206 from the top-down view 204, and the ground truth floor plan 208. Put differently, the cost function may determine the statistical percentage of the number of times the ANN 206 outputs an estimated floor plan that correctly matches the desired output. Following processing of the top-down view 204, the resulting estimated floor plan is compared using the cost function against the ground truth floor plan 208 to determine the accuracy of the estimated floor plan. Based on this determined accuracy, the ANN 206 is trained by adjusting weights of the edges between various layers of the ANN 206 so that the error rate of the ANN 206 decreases over time, e.g. the ANN 206 has an increasing percentage of correctly estimated floor plans. In some embodiments, one or more bias factors and/or other variables may likewise be adjust based on feedback from the cost function.

The cost function may be executed by ANN 206 or as part of ANN 206, or may be evaluated by a separate function or module responsible for the supervised learning process, which may then coordinate adjustment of the edge weights to tune the ANN 206. Once the error rate becomes relatively static, where further training does not reduce the error rate or increase the percentage of correct estimations, the ANN 206 may be considered to be trained.

The foregoing is one possible embodiment. However, other embodiments may employ different training methods depending upon the end goal, such as unsupervised, hybrid or semi-supervised, or reinforcement learning. Further, in some embodiments preprocessing may be performed on the top-down view 204 image, such as edge detection. The depth points depicted in a top-down view 204 may form features that edge detection (or similar techniques) can highlight, which may simplify and/or speed processing by ANN 206. Other embodiments may use various preprocessing techniques to allow flexibility in accepting input images, e.g. images of varying sizes and/or color images, potentially to simplify the implementation of the ANN 206.

Figure 3:
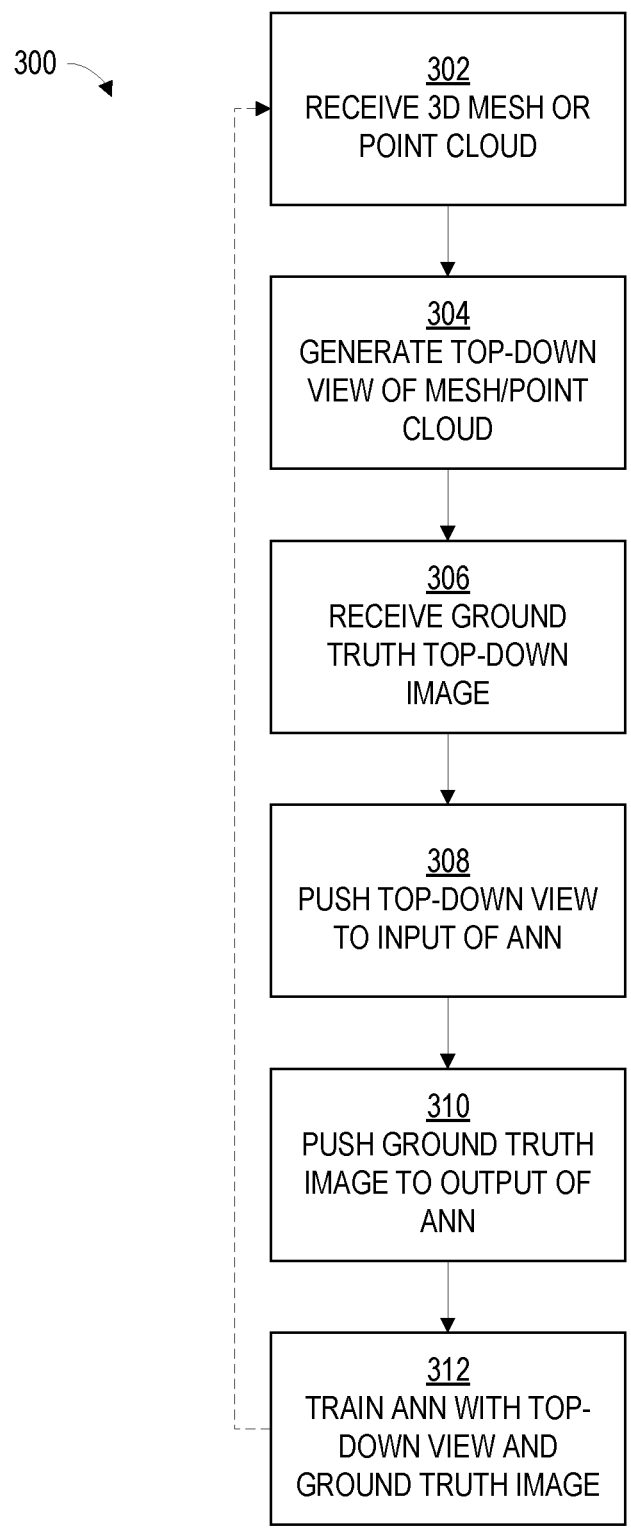
FIG. 3 is a flowchart of the operations of an example method for training a machine learning system to generate 2D plan views, according to various embodiments.

FIG. 3 depicts the operations of an example method 300 for training an ANN, such as ANN 206. Method 300 may be considered an embodiment of process flow 200 and/or descriptive of the operations carried out as part of process flow 200. Depending on the specifics of a given implementation, the operations of method 300 may be carried out in whole or in part, and may be carried out in the depicted order or out of order. Some embodiments may omit one or more operations or add one or more operations of method 300. Method 300 may be performed by some or all components of system 100, and/or additional or alternative components. Furthermore, the reader is referred to the foregoing description of process flow 200 of FIG. 2, as many of the details there are equally applicable to the operations of method 300.

In operation 302 of the example method 300, a 3D mesh or point cloud is received. The 3D mesh or point cloud may be a 3D mesh or point cloud 202 of process flow 200 (FIG. 2). The 3D mesh or point cloud may be received at a device that prepares a top-down view image for feeding into an ANN. In some embodiments, the device may both prepare the top-down view image and host or otherwise executes the ANN. In other embodiments, the device may just prepare the top-down view image, and then hand the image off to a separate device that hosts or executes the ANN. In some embodiments, the device may be a server that is in network communication with a capturing device or another device that may store or generate the 3D mesh or point cloud. In embodiments, the device may be a central server 110 (FIG. 1).

In operation 304, the receiving device generates the top-down view image of the 3D mesh or point cloud. With reference to process flow 200, the top-down view image is the top-down view 204. As described above with respect to process flow 200, camera motion data may be used to orient a view of the 3D mesh or point cloud that looks directly down upon a ground or floor plane. Once so oriented, a 2D image can be created from the top-down view, such as by projecting all points in the 3D mesh or point cloud onto the ground or floor plane. While operation 306 is described as generating the top-down view image, it should be understood that in some embodiments the image is received from a separate or external system that has received or stores the 3D mesh or point cloud and handles generation of the top-down view image.

In operation 306, the receiving device receives a ground truth top-down image. With reference to example process flow 200, the ground truth top-down image would be the ground truth floor plan 208. As discussed above with respect to the ground truth floor plan 208, the ground truth top-down image may be obtained using means other than the scan that results in the 3D mesh or point cloud. Techniques may include direct measurements, separate scans, manual entry from measurements, reference to construction plans or blueprints, or any other suitable method for obtaining a suitably precise and accurate 2D floor plan of the 3D space scanned to create the 3D mesh or point cloud.

In operation 308, the top-down view image from operation 304 is pushed to the input of an artificial neural network that estimates floor plans. Similarly, in operation 310, the ground truth top-down image is supplied or pushed to the output of the ANN. For purposes of example method 300, the ANN (or implementing system) is configured to train the ANN.

In operation 312, the ANN is trained on the pushed top-down view image and ground truth top-down image. The ANN processes the top-down view image pushed to its input in operation 308, and generates an estimated floor plan. In training and as described above with respect to FIG. 2, a cost function is then used to assess how accurate the estimated floor plan from the ANN is compared to the ground truth top-down image. Based on this assessment, various weights and biases within the ANN are tweaked to improve accuracy. The adjustments to weights may be determined using a known process for training ANNs, such as stochastic gradient descent, which helps determine how to adjust the ANN weights to increase accuracy. Once the weights are adjusted, the top-down view image may again be processed through the adjusted ANN to generate a new estimated floor plan, which is again compared to the ground truth top-down image by the cost function. These iterations may continue until a point of diminishing returns is reached, viz. further iterations do not result in further improvements in accuracy. As is known, each iteration of the estimated floor plan and subsequent adjustment is known as an epoch.

As seen in FIG. 3, operation 312 may iterate back to operation 302, to receive a new 3D mesh or point cloud. For training the ANN, a test or training data set may be employed that includes an array of different 3D meshes or point clouds for spaces of a variety of configurations. In some embodiments, the training data set includes 3D meshes or point clouds of all types of spaces anticipated to be encountered for processing through the ANN, so that the ANN is fully trained on any possible scenario. Thus, method 300 may be repeated for each 3D mesh or point cloud within the training set. Depending on the specifics of a given embodiment, the iteration of epochs for operation 312 may be carried on each successive model in the training data set, or all models in the training data set may be processed through each epoch. For example, where epochs are run on each successive model, each model may be iterated 500 times before the next model is processed. Conversely, where all models are processed through each iteration, each model is passed through once on each epoch, with each epoch cycling through all models of the training data set. In such embodiments, adjustments to the various ANN weights are averaged or accumulated across all models in the training data set for each epoch, as will be understood by a person skilled in the relevant art.

Figure 4:
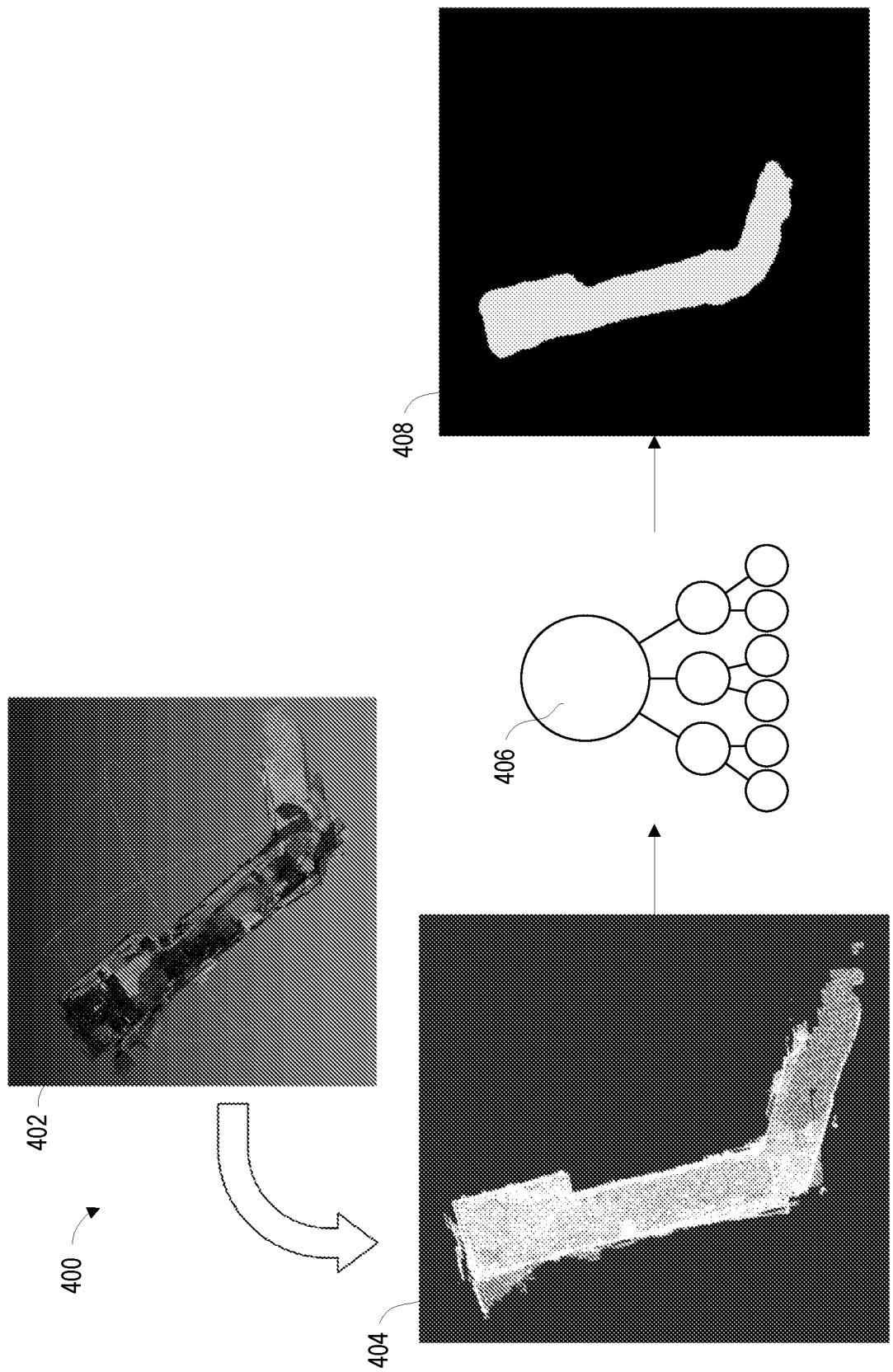
FIG. 4 depicts an example process flow for using a trained machine learning system to generate a 2D plan view from a 3D mesh or point cloud, according to various embodiments.

In FIG. 4, an example process flow 400 is depicted for generating an estimated floor plan from a trained ANN. Process flow 400 is essentially identical to process flow 200, and the reader is directed to the foregoing description of the elements of process flow 200 above, with respect to FIG. 2. As with process flow 200, process flow 400 begins with a 3D mesh or point cloud 402, which is used to generate a top-down view 404 image, similar to top-down view 204 of process flow 200. This top-down view 404 is then supplied as an input to ANN 406. ANN 406 then yields an estimated floor plan 408. Process flow 400 is carried out following the completion of process flow 200 and method 300. Thus, ANN 406 is the result of ANN 206 having been fully trained on a training data set, as described with respect to method 300. It will be recognized that the estimated floor plan 408 is indicated as coming from ANN 406 rather than being pushed to the output of ANN 406, as ANN 406 has been fully trained to generate an estimated floor plan 408.

Figure 5:
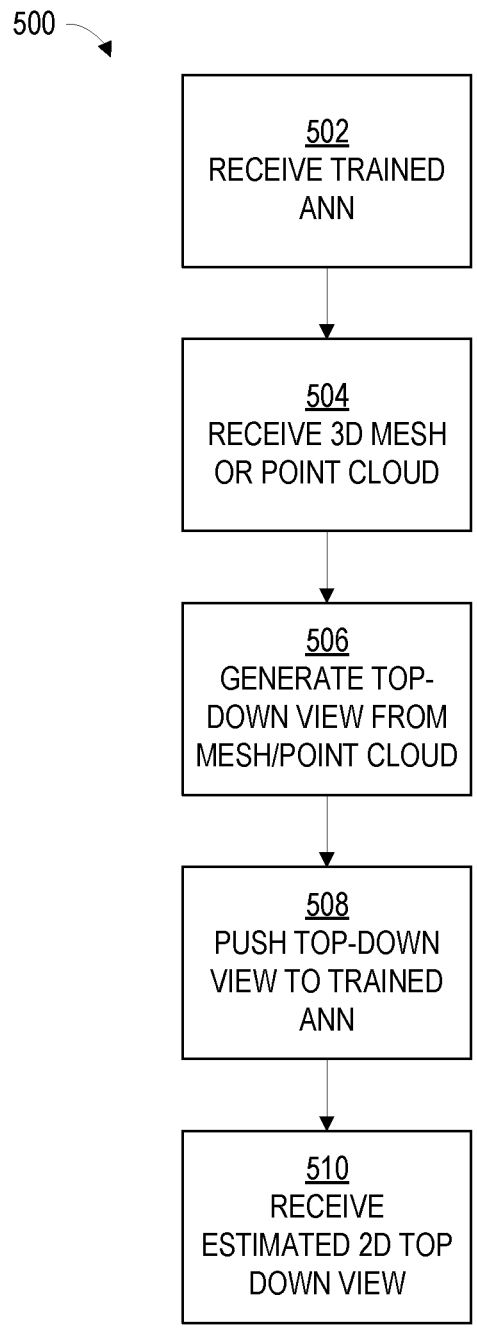
FIG. 5 is a flowchart of the operations of an example method for generating a 2D plan view from a 3D mesh or point cloud using a trained machine learning system, according to various embodiments.

FIG. 5 depicts the operations of an example method 500 for using a trained ANN, such as ANN 406. Method 500 may be considered an embodiment of process flow 400 and/or descriptive of the operations carried out as part of process flow 400. Depending on the specifics of a given implementation, the operations of method 500 may be carried out in whole or in part, and may be carried out in the depicted order or out of order. Some embodiments may omit one or more operations or add one or more operations of method 500. Method 500 may be performed by some or all components of system 100, and/or additional or alternative components. Furthermore, the reader is referred to the foregoing descriptions of process flow 200 of FIG. 2 and process flow 400 of FIG. 4, as many of the details there are equally applicable to the operations of method 500.

In operation 502, a trained ANN is obtained, such as may result from example process flow 200 and example method 300. The trained ANN may be a trained ANN 406 from process flow 400. In some embodiments, the trained ANN may be the ANN 206 from process flow 200 following completion of method 300, hosted on the system used to train the ANN. In such an embodiment, the ANN may simply be switched out of a training mode, such as by deactivation of the cost function and freezing of the weights of the trained ANN. In other embodiments, the ANN may have been trained on a separate system, and may be provided to a system implementing process flow 400 and/or method 500 that is otherwise not used for training of an ANN.

In operation 504, a 3D mesh or point cloud of a scanned 3D space where an estimated floor plan is desired is received. The 3D mesh or point cloud may be a 3D mesh or point cloud 402, with respect to FIG. 4. In operation 506, a top-down view is generated, similar to the generation of a top-down view described above with respect to operation 304 of method 300 (FIG. 3).

With the trained ANN, the top-down view is pushed to the input of the ANN in operation 508. The ANN then processes the pushed top-down view, and estimates a floor plan in the form of a 2D top down view, similar in nature to the ground truth top-down images used to train the ANN in method 300.

Where the ANN is trained on a variety of different 3D meshes or point clouds and associated ground truth top-down images, the ANN may be able to provide estimated floor plans for any type of 3D mesh or point cloud for which the ANN was trained. For example, by training the ANN on open loop scans and 3D spaces with unusual angles or features, which may be challenging or impossible for existing methods to process, reliably accurate estimated floor plans may be obtained. By training the ANN to recognize such scenarios and output plans that closely match the provided ground truth views, the limitations of conventional programmed techniques can be overcome.

Figure 6:
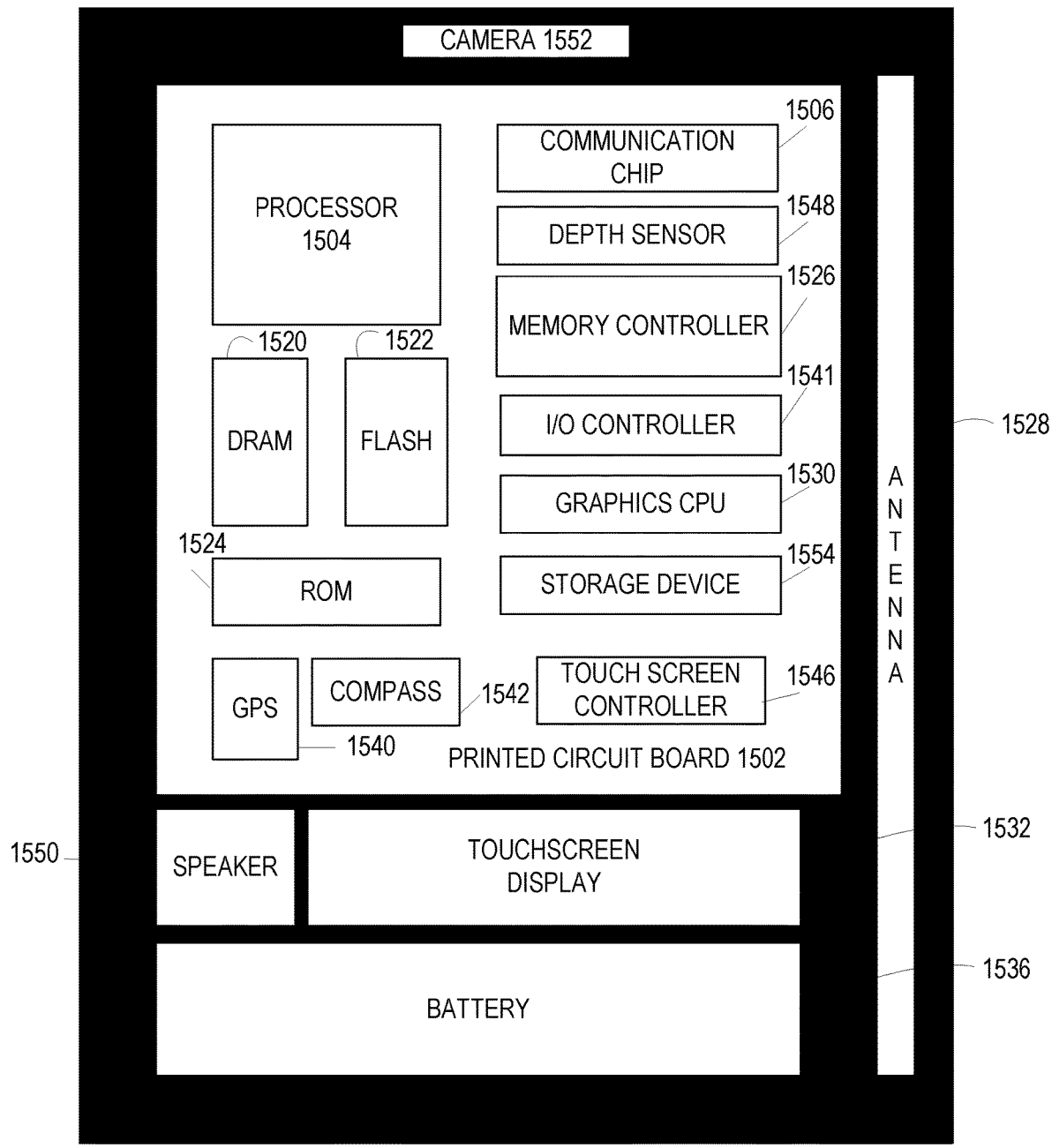
FIG. 6 is a block diagram of an example computer that can be used to implement some or all of the components of the disclosed systems and methods, according to various embodiments.

FIG. 6 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of process flow 200, method 300, process flow 400, or method 500, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) process flow 200, method 300, process flow 400, or method 500, described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for training an artificial neural network (ANN) to provide a 2D floor plan, comprising:
    receiving, by a computing device, a top-down view of a 3D mesh or point cloud of a 3D space, the 3D space comprising at least one of an open loop scan or noisy scans;
    receiving, at the computing device, a ground truth 2D floor plan image of the space;
    pushing, by the computing device, the top-down view to an input side of the ANN;
    pushing, by the computing device, the ground truth 2D floor plan image to an output side of the ANN;
    training, by the computing device, the ANN with the pushed top-down view and ground truth 2D floor plan image to enable the ANN to generate floor plan estimates for 3D spaces having open loop scans or noisy scans; and
    generating, using the trained ANN, an estimated 2D floor plan for a new 3D space comprising at least one of an open loop scan or unusual geometric features.

2. The method of claim 1, further comprising:
    receiving, from a capturing device at the computing device, a scan of a 3D space; and
    creating, by the computing device from the scan of the 3D space, the 3D mesh or point cloud.

3. The method of claim 2, wherein receiving a top-down view of the 3D mesh or point cloud of the 3D space comprises generating the top-down view from the 3D mesh or point cloud.

4. The method of claim 3, wherein the top-down view is a 3D image, and generating the top-down view from the 3D mesh or point cloud comprises projecting the 3D mesh or point cloud onto a floor plane of the 3D mesh or point cloud.

5. The method of claim 1, wherein the 3D mesh or point cloud comprises a first 3D mesh or point cloud, and further comprising:
    receiving, at the computing device following training, a top-down view of a second 3D mesh or point cloud of the new 3D space;
    pushing, by the computing device, the top-down view of the second 3D mesh or point cloud to the ANN; and
    obtaining, from the ANN, the estimated 2D floor plan.

6. The method of claim 5, further comprising generating the top-down view of the second 3D mesh or point cloud by projecting the second 3D mesh or point cloud onto a floor plane of the second 3D mesh or point cloud.

7. A non-transitory computer-readable medium (CRM) comprising instructions that, when executed by a processor of an apparatus, cause the apparatus to:
    receive a top-down view of a 3D mesh or point cloud of a 3D space, the 3D space comprising at least one of an open loop scan or noisy scans;
    receive a ground truth top-down image of the space;
    push the top-down view to an input side of an artificial neural network (ANN);
    push the ground truth top-down image to an output side of the ANN;
    train the ANN with the pushed top-down view and ground truth top-down image to enable the ANN to generate floor plan estimates for 3D spaces having open loop scans or noisy scans; and
    generating, using the trained ANN, an estimated 2D floor plan for a new 3D space comprising at least one of an open loop scan or unusual geometric features.

8. The CRM of claim 7, wherein the instructions are to further cause the apparatus to:
    receive, from a capturing device at the computing device, a scan of a 3D space; and
    create, by the computing device from the scan of the 3D space, the 3D mesh or point cloud.

9. The CRM of claim 8, wherein the instructions are to cause the apparatus to receive a top-down view of the 3D mesh or point cloud of the 3D space by generating the top-down view from the 3D mesh or point cloud.

10. The CRM of claim 9, wherein the top-down view is a 3D image, and the instructions are to cause the apparatus to generate the top-down view from the 3D mesh or point cloud by projecting the 3D mesh or point cloud onto a floor plane of the 3D mesh or point cloud.

11. The CRM of claim 10, wherein the 3D mesh or point cloud comprises camera intrinsics and camera motion data, and the camera intrinsics and camera motion data are used to identify the floor plane of the 3D mesh or point cloud.

12. The CRM of claim 7, wherein the 3D mesh or point cloud comprises a first 3D mesh or point cloud, and wherein the instructions are to further cause the apparatus to:
- receive, following training, a top-down view of a second 3D mesh or point cloud of the new 3D space;
- push the top-down view of the second 3D mesh or point cloud to the ANN; and
- obtain, from the ANN, the estimated 2D floor plan.

13. The CRM of claim 12, wherein the instructions are to cause the apparatus to generate the top-down view of the second 3D mesh or point cloud by projecting the second 3D mesh or point cloud onto a floor plane of the second 3D mesh or point cloud.

14. The CRM of claim 7, wherein the apparatus comprises a server, and the instructions are to cause the apparatus to receive the 3D mesh or point cloud from a remote device.

15. A system, comprising:
- a network interface;
- a storage medium; and
- a processor,
- wherein the storage medium stores instructions that when executed by the processor cause the system to:
  - receive a top-down view of a 3D mesh or point cloud of a 3D space, the 3D space comprising at least one of an open loop scan or noisy scans;
  - receive a ground truth top-down image of the space;
  - push the top-down view to an input side of an artificial neural network (ANN);
  - push the ground truth top-down image to an output side of the ANN;
  - train the ANN with the pushed top-down view and ground truth top-down image to enable the ANN to generate floor plan estimates for 3D spaces having open loop scans or noisy scans; and
  - generating, using the trained ANN, an estimated 2D floor plan for a new 3D space comprising at least one of an open loop scan or unusual geometric features.

16. The system of claim 15, wherein the instructions, when executed by the processor, are to further cause the system to:
- receive, following training, a top-down view of a second 3D mesh or point cloud of the new 3D space;
- push the top-down view of the second 3D mesh or point cloud to the ANN; and
- obtain, from the ANN, the estimated 2D floor plan.

17. The system of claim 16, wherein the top-down view of the second 3D mesh or point cloud is received from a remote device over the network interface.

18. The system of claim 17, wherein the instructions, when executed by the processor, are to further cause the system to generate the top-down view from the 3D mesh or point cloud by projecting the 3D mesh or point cloud onto a floor plane of the 3D mesh or point cloud, and to generate the top-down view from the second 3D mesh or point cloud by projecting the second 3D mesh or point cloud onto a floor plane of the second 3D mesh or point cloud.

19. The system of claim 18, wherein the 3D mesh or point cloud and second 3D mesh or point cloud each comprise camera intrinsics and camera motion data, and the camera intrinsics and camera motion data are used to identify the floor plane of the 3D mesh or point cloud and the floor plane of the second 3D mesh or point cloud.

20. The system of claim 16, wherein the system comprises a server, and the system further comprises a remote device in network communication with the server, the remote device adapted to capture the second 3D mesh or point cloud.

* * * * *